United States Patent
Turnbull et al.

(10) Patent No.: US 8,935,164 B2
(45) Date of Patent: Jan. 13, 2015

(54) NON-SPATIAL SPEECH DETECTION SYSTEM AND METHOD OF USING SAME

(75) Inventors: Robert R. Turnbull, Holland, MI (US); Michael A. Bryson, Hudsonville, MI (US)

(73) Assignee: Gentex Corporation, Zeeland, MI (US)

( * ) Notice: Subject to any disclaimer, the term of this patent is extended or adjusted under 35 U.S.C. 154(b) by 296 days.

(21) Appl. No.: 13/462,506

(22) Filed: May 2, 2012

(65) Prior Publication Data

US 2013/0297305 A1 Nov. 7, 2013

(51) Int. Cl.
*G10L 15/20* (2006.01)
*G10L 19/00* (2013.01)
*G10L 21/02* (2013.01)
*G10L 21/00* (2013.01)

(52) U.S. Cl.
USPC ........... 704/233; 704/216; 704/217; 704/218; 704/226; 704/227; 704/228; 704/275

(58) Field of Classification Search
USPC ......... 704/216, 217, 218, 226, 227, 228, 233, 704/275
See application file for complete search history.

(56) References Cited

U.S. PATENT DOCUMENTS

| | | | |
|---|---|---|---|
| 4,688,187 A * | 8/1987 | McWhirter | 708/819 |
| 6,594,367 B1 * | 7/2003 | Marash et al. | 381/92 |
| 2007/0076898 A1 | 4/2007 | Sarroukh et al. | |
| 2009/0055170 A1 * | 2/2009 | Nagahama | 704/226 |
| 2009/0119103 A1 * | 5/2009 | Gerl et al. | 704/243 |
| 2009/0125311 A1 * | 5/2009 | Haulick et al. | 704/275 |
| 2010/0177908 A1 | 7/2010 | Seltzer et al. | |
| 2010/0217590 A1 * | 8/2010 | Nemer et al. | 704/233 |
| 2013/0259254 A1 * | 10/2013 | Xiang et al. | 381/73.1 |

OTHER PUBLICATIONS

Kai-Bor Yu, "Recursive updating the eigenvalue decomposition of a covariance matrix," Signal Processing, IEEE Transactions on , vol. 39, No. 5, pp. 1136,1145, May 1991.*
Aarabi et al., "Phase-Based Dual Microphone Robust Speech Enhancement," IEEE Transactions on Systems, Man, and Cybernetics—Part B Cybernetics, vol. 34, No. 4, Aug. 2004, pp. 1763-1773.*
Schwetz et al., "A Cross-Spectrum Weighting Algorithm for Speech Enhancement and Array Processing: Combining Phase-shift Information and Stationary Signal Properties", Journal of the Acoustical Society of America, 119(2), Feb. 2006, pp. 952-964.*

* cited by examiner

*Primary Examiner* — Edgar Guerra-Erazo
(74) *Attorney, Agent, or Firm* — Price Heneveld LLP; Scott P. Ryan

(57) ABSTRACT

A non-spatial speech detection system includes a plurality of microphones whose output is supplied to a fixed beamformer. An adaptive beamformer is used for receiving the output of the plurality of microphones and one or more processors are used for processing an output from the fixed beamformer and identifying speech from noise though the use of an algorithm utilizing a covariance matrix.

23 Claims, 3 Drawing Sheets

NON-SPATIAL SPEECH DETECTION SYSTEM AND METHOD OF USING SAME

FIELD OF THE INVENTION

The present invention relates generally to noise reduction and more specifically to a noise reduction system applicable for use with electronic equipment in a vehicular environment.

BACKGROUND

Microphones used in automotive electronic applications, such as cell phones, navigational systems, and vehicular control, are well-known in the art. Automotive vehicle operations present many challenges in the use of a microphone located within a vehicle interior in view of the numerous sources of noise that can interfere with vocalized speech.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
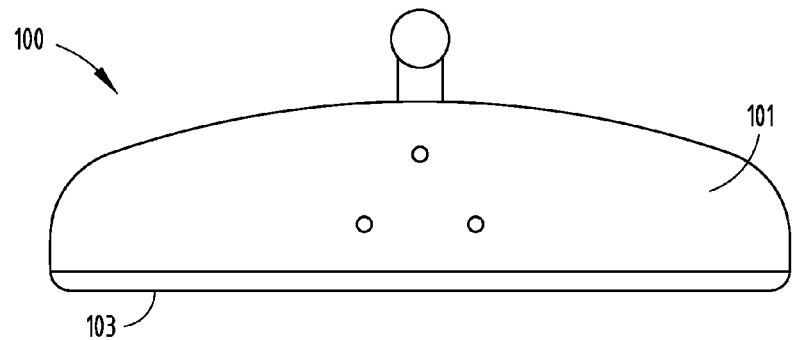
FIG. 1 is a top view of a rearview mirror or rearview display assembly as used in a vehicle that includes a plurality of microphone ports in accordance with various embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

SUMMARY OF THE INVENTION

According to an embodiment of the present invention, a non-spatial speech detection system includes a plurality of microphones, and a fixed beamformer for receiving the output of the plurality of microphones. An adaptive beamformer is used for receiving the output of the plurality of microphone and at least one processor is for processing an output from the fixed beamformer and identifying speech from noise using algorithm utilizing a covariance matrix. Thus, in an automotive environment a determinant of a M×M covariance matrix can provide superior performance in identifying speech in a noisy environment. Since noise signals tend to be linearly independent and the speech signals tend to be is linearly dependent, the use of a covariance matrix according to an embodiment of the invention works as a linear independence test for allowing speech that is included with high levels of noise (low SNR) to be more easily identified.

DETAILED DESCRIPTION

Before describing in detail embodiments that are in accordance with the present invention, it should be observed that the embodiments reside primarily in combinations of method steps and apparatus components related to an adaptive or space-time noise reduction system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a space-time noise reduction system as described herein. The non-processor circuits may include, but are not limited to, a radio receiver, a radio transmitter, signal drivers, clock circuits, power source circuits, and user input devices. As such, these functions may be interpreted as steps of a method to perform adaptive or space-time noise reduction. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

For some automotive applications, particularly hands free telephone calls as used in the vehicle, it is desirable to capture and/or include both the driver and front seat passenger's voice for use in the mobile call. Previous microphone systems that were integrated into the vehicle have primarily used voice phase from the driver's speech in determining a voice's source and location within the vehicle. Although some phase or angular information might have also been available for use in voice detection, its use was primarily used to reject noise rather than detecting voice. Those skilled in the art will recognize that in a vehicular environment where more than one pair of microphones are used, the processing required for such calculations can become very intensive. These types of challenges can be particularly difficult when adapting a microphone solution for use in the vehicle's rearview mirror assembly. In addition to the difficulties of rejecting noise within the vehicle, due to reflections and disturbances to the sound field caused by the rearview mirror or equivalent display module, windshield and other objects around the driver and passengers must also be addressed.

Previous speech/noise discrimination algorithms have ignored or not fully utilized the amplitude information determined by the microphones in determining location. As described in a paper by Douglas Cochran entitled "A Geometric Approach to Multiple-Channel Signal Detection", a generalized coherence (GC) estimate is introduced that examines its application as a statistic for detecting the presence of a common signal on noisy channels. Cochran describes the GC estimate as developed as a natural generalization of the magnitude-squared coherence (MSC) estimate. This process is then subsequently used for detecting voice while also suppressing the influence of interference noise. The GC approach is found to provide better detection performance than the MSC approach in terms of the minimum of signal-to-noise ratio on all data channels necessary to achieve desired combinations of detection and false alarm probabilities. The new algorithm, according to an embodiment of the present invention, uses a covariance matrix, such as a Gram matrix, for signal detection. This algorithm has been found to operate well in an automotive environment. Because of the acoustic reflections present in the automotive environment, phase/angular data can be unreliable, difficult to predict which can make it vary greatly between vehicles. Phase/angular data has been used to locate a user's voice in a noisy vehicular environment but does not perform consistently. Hence, it is advantageous to utilize all available amplitude and phase information to better recognize and interpret speech in a noisy environment.

Prior systems include audio signal processing technology in which an adaptive beamformer processes input signals from microphones based on an estimate received from a pre-filter. The adaptive beamformer computes parameters (e.g. weights) for each frame based on the estimate, via a magnitude-domain objective function or log-magnitude-domain objective function. The pre-filter includes a time invariant beamformer and/or a non-linear "spatial" filter, and/or may include a spectral filter. The computed parameters may be adjusted based on a constraint, which may be selectively applied only at desired times. While this approach works well in an office environment with minimal acoustic reflections, it is less successful in an automotive environment with many strong reflections closely spaced in time.

FIG. 1 is a top view of a rearview assembly using a vehicular microphone system in accordance with an embodiment of the invention. The rearview microphone assembly 100 includes a housing 101 that is supported within the interior of the vehicle. A rearview device is used by the driver to view objects from the rear of the vehicle and may include a mirrored element such as an electrochromic (EC) glass element 103, rearview display or a combination thereof. Each microphone assembly 105 may include two or more transducers, such as microphones, that are positioned within the microphone assembly 100 and are used to capture voice or other intended audio signals from inside a vehicle. Those skilled in the art will recognize that the microphones may be placed either at the top, bottom and/or other surfaces of the housing. Although FIG. 1 illustrates microphone ports, those skilled in the art will recognize that a corresponding microphone device is generally located in close proximity to each port.

Although two microphones can be used, FIG. 1 illustrates an example of a microphone array that is configured using a greater number of microphones or a greater number of ports located in predetermined positions. Although the plurality of microphones illustrated in FIG. 1 is used in connection with a rearview assembly, it will also be recognized that the spirit of the invention is not so limited as the plurality of microphones might also be mounted in a vehicle headliner, overhead console, A-pillar, other convenient location or a combination thereof. Additionally, the plurality of microphones may be located in different orientations in the rearview assembly including but not limited to other tandem and/or parallel or triangular configurations. It should also be understood that the phrase "rear view assembly" can be used interchangeably with "rearview display" while either system can be camera based, reflective or a combination thereof.

Figure 2:
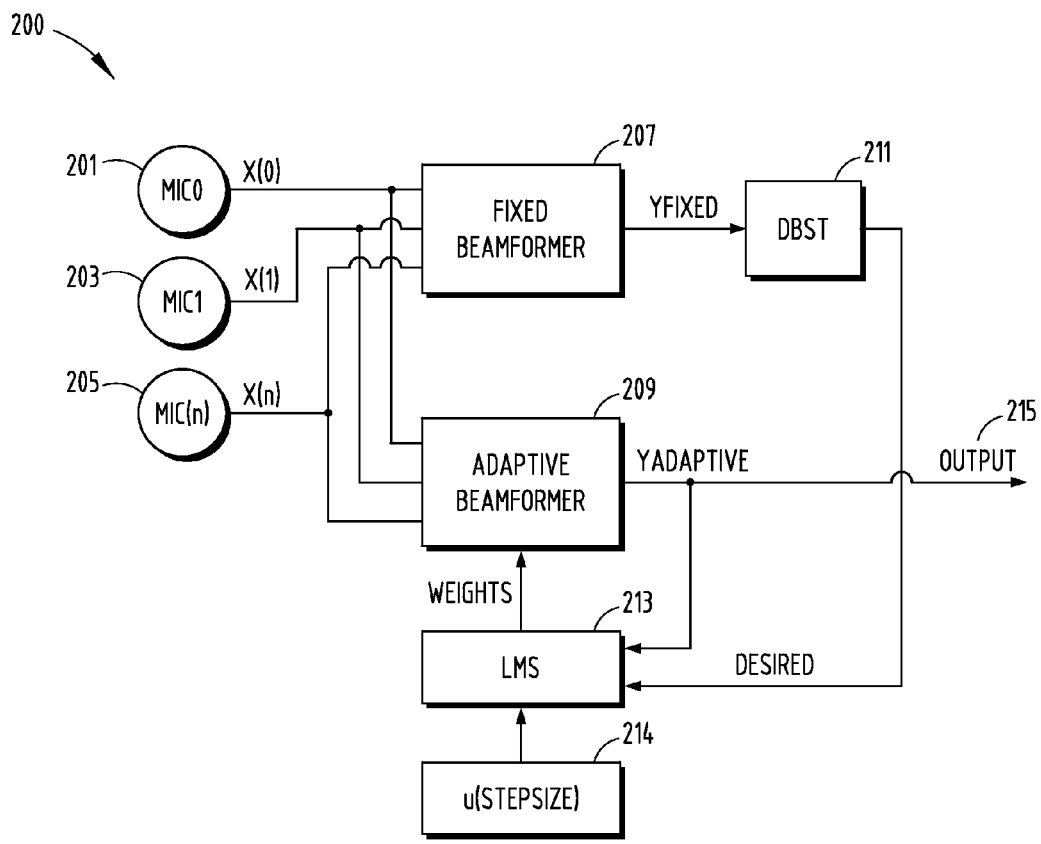
FIG. 2 is a block diagram showing the system configuration using the plurality of microphones as used with fixed and adaptive beamformers according to an embodiment of the present invention.

FIG. 2 is a block diagram showing a non-spatial speech detection system using a plurality of microphones with fixed and adaptive beamformers according to an embodiment of the present invention. Microphones 201, 203, 205 receive analog information and are configured to provide a digital signal to both a fixed beamformer 207 and an adaptive beamformer 209 via connections x(0), x(1) and x(n) where any number n microphones can input to the fixed beamformer 207 and adaptive beamformer 209. The purpose of the fixed beamformer is to provide a pilot or guide beam aimed in some primary direction. The output (Y fixed) of the fixed beamformer is provided to a Determinant-Bryson-Schwetz-Turnbull (DBST) algorithm 211 as described herein. As described herein, the DBST algorithm 211 is configured to determine and/or identify speech from noise by using a scaled version of a covariance matrix. In probability theory and statistics, a covariance matrix (also known as dispersion matrix or variance covariance matrix) is a matrix whose element in the i, j position is the covariance between the $i^{th}$ and $j^{th}$ elements of a random vector (that is, of a vector of random variables). Each element of the vector is a scalar random variable, either with a finite number of observed empirical values or with a finite or infinite number of potential values specified by a theoretical joint probability distribution of all the random variables. Intuitively, the covariance matrix generalizes the notion of variance to multiple dimensions. As an example, the variation in a collection of random points in two-dimensional space cannot be characterized fully by a single number, nor would the variances in the x and y directions contain all of the necessary information; a 2×2 matrix would be necessary to fully characterize the two-dimensional variation.

As will be further described herein, the output of the DBST algorithm provides a substantially noise free reference speech signal for the a least mean squares (LMS) algorithm 213 with noise bands gated out or attenuated to enhance the speech. This process lends itself well to further generation wide band mobile telephone audio where high frequency content can be transmitted over the telephone network. Although an LMS algorithm is illustrated in FIG. 2, those skilled in the art will recognize that regularized least mean square (RLMS), normalized least means squares (NLMS) algorithms or the like, may also be used. As seen in FIG. 2, the weights of the adaptive beamformer 209 for the various frequency bands from the LMS calculation 213 can be controlled by varying the mu (μ) step size 214. The adaptive beamformer 209 configured for adjusting the magnitude and phase of each microphone 201, 203, 205 and provides feedback to the LMS calculation 213. The Y adaptive output of the adaptive beamformer 209 is then provided as an output 215. This output represents the best linear approximation to the nonlinear processed fixed beam. As such, it provides a noise reduced low distortion speech signal for telephony and speech recognition. Because of the linearity of the adaptive beamformer this signal can be processed by an echo canceller or other adaptive filter without suffering convergence issues due to nonlinear distortions. The mu (μ) step size adjustment factor should be adjusted to minimize distortion and facilitate convergence of echo cancellers and other adaptive filtering processes that follow.

Figure 3:
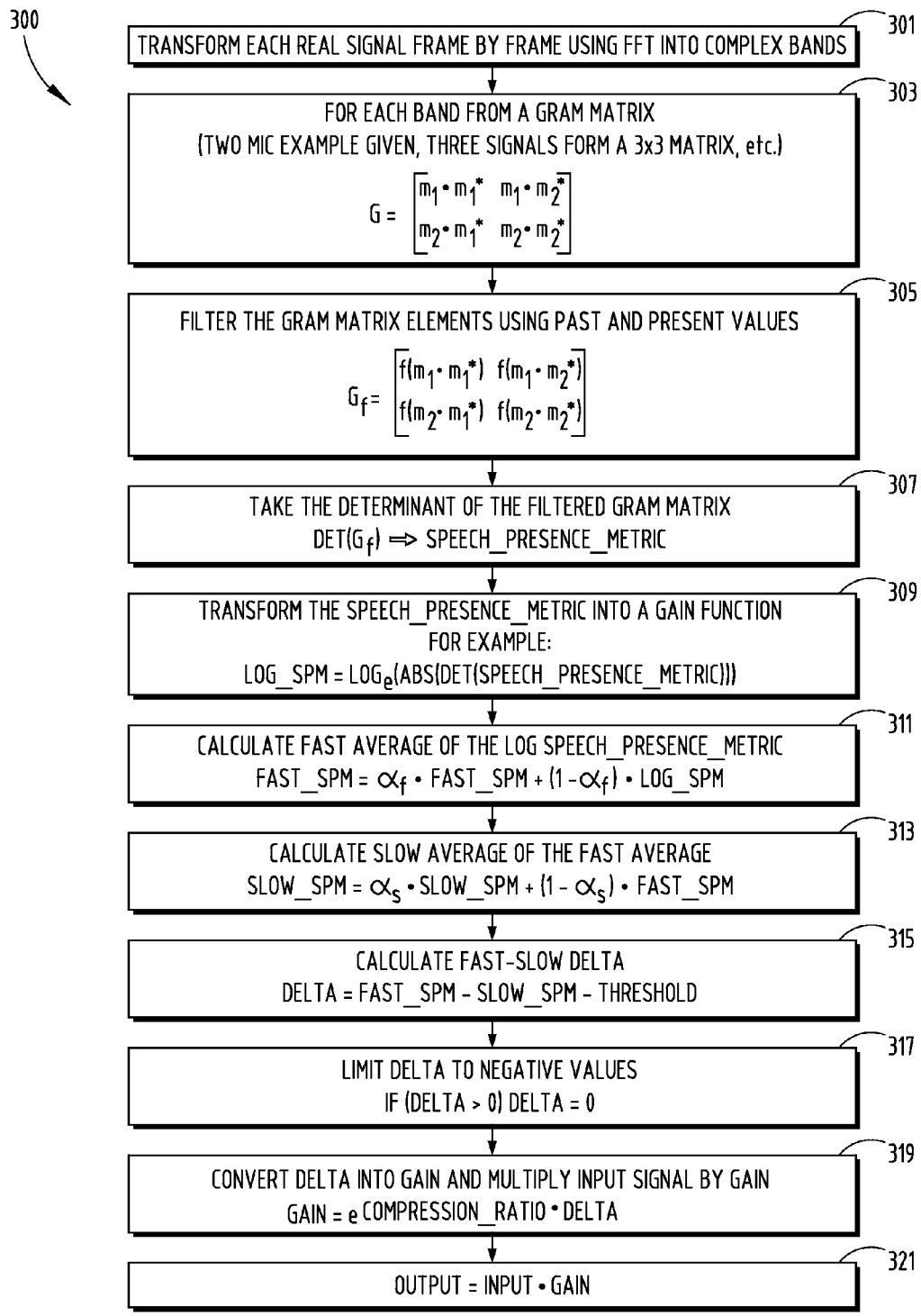
FIG. 3 is a flow chart diagram illustrating the process of speech detection in accordance with an embodiment of the invention.

FIG. 3 is a flow chart diagram illustrating the process of speech detection in accordance with an embodiment of the invention. The speech detection process 300 includes transforming each real signal frame-by-frame using a fast Fourier transform (FFT) into complex bands or bins 301. Typically, there are 32 samples taken at approximately a 16 KHz sampling rate that are transformed in 32 frequency bands that are each represented by complex numbers. These bands typically can range in frequency from 0 to 7.75 KHz. For each band, a covariance matrix is formed for a given number of microphones. By way of example and not limitation, a Gram matrix is shown in Equation 1 and described throughout where two microphones outputs are formed into a 2×2 matrix as shown below:

$$G = \begin{bmatrix} m_1 \cdot m_1^* & m_1 \cdot m_2^* \\ m_2 \cdot m_1^* & m_2 \cdot m_2^* \end{bmatrix} \qquad \text{Eq. (1)}$$

where microphones $m_1$ and $m_2$ are the complex frequency domain representations of the respective microphone inputs for a given frequency band as well as its conjugate $m_1^*$, $m_2^*$ etc.

Thereafter, the Gram matrix elements are low pass filtered using both past and present values 305 such as shown in Equation (2). Those skilled in the art will further recognize that the low pass filtering process could also be carried out by numerical integration.

$$G_f = \begin{bmatrix} f(m_1 \cdot m_1^*) & f(m_1 \cdot m_2^*) \\ f(m_2 \cdot m_1^*) & f(m_2 \cdot m_2^*) \end{bmatrix} \qquad \text{Eq. (2)}$$

A determinant of the low pass filtered Gram matrix is calculated, which may be either real positive or negative, to determine a speech presence metric 307 according to Equation (3). A complex representation of the microphone m1 is multiplied with its complex conjugate m1* that is known as an inner product that is used to formulate the determinant. Those skilled in the art will further recognize that in linear algebra, a "determinant" is a value associated with a square matrix. It can be computed from the entries of the matrix by a specific arithmetic expression, while other ways to determine its value exist as well. The determinant provides important information when the covariance matrix is that of the coefficients of a system of linear equations, or when it corresponds to a linear transformation of a vector space. When the matrix is that of coefficients of a system of linear equations, a unique solution exists only if the determinant is nonzero. In the case of linear transformation, that same condition means that the transformation has an inverse operation. A geometric interpretation can be given to the value of the determinant of a square matrix with real entries where: the absolute value of the determinant gives the scale factor which is multiplied under the associated linear transformation. Its sign (+/−) indicates whether the transformation preserves orientation.

$$\det(G_f) \rightarrow \text{Speech\_Presence\_Metric} \qquad \text{Eq. (3)}$$

Thus, the speech presence metric (spm) is transformed into a gain function 309 according to Equation (4) by using a logarithmic function of the absolute value of the speech presence metric. Although $\log_e$ is shown herein, those skilled in the art will recognize that any log base ($\log_x$) could be used in order scale the speech presence metric in a desired range. Thus, the speech presence metric is merely a scaled version of a covariance matrix such as the Gram matrix as described herein.

$$\log\_spm = \log_e(\text{abs}(\text{Speech\_Presence\_Metric})) \qquad \text{Eq. (4)}$$

A fast average of the log Speech Presence Metric is calculated 311 as in Equation (5):

$$\text{fast\_spm} = \alpha_f \text{fast\_spm} + (1 - \alpha_f) \log\_spm \qquad \text{Eq. (5)}$$

A slow average of the fast average is calculated 313 according to Equation (6), alternatively log_spm may be used in place of fast_spm in Equation (6):

$$\text{slow\_spm} = \alpha_s \text{slow\_spm} - (1 - \alpha_s) \text{fast\_spm} \qquad \text{Eq. (6)}$$

The difference or delta between the fast average (fast_spm) and slow average (slow_spm) are determined 315 as in Equation (7). The threshold is used to set the minimum signal-to-noise ratio for speech detection:

$$\text{delta} = \text{fast\_spm} - \text{slow\_spm} - \text{threshold} \qquad \text{Eq. (7)}$$

This difference is then limited to its negative values 317 as shown in Equation (8):

$$\text{If}(\text{delta} > 0) \text{delta} = 0 \qquad \text{Eq. (8)}$$

Finally, the difference is converted to a gain figure 319 in Equation (9). The compression ratio is used to control the amount of noise suppression to avoid excessive distortion:

$$\text{gain} = e^{\text{compression\_ratio} \cdot \text{delta}} \qquad \text{Eq. (9)}$$

The output of the fixed beamformer Y fixed is multiplied by the gain in Equation (9) to obtain the nonlinear noise reduced signal 321. This is the reference signal for the adaptive beamformer but can also be used as a system output if the nonlinearity is not objectionable such as for speech recognition purposes.

$$\text{Output} = \text{Input} \cdot \text{Gain} \qquad \text{Eq. (10)}$$

Other more complex gain functions are also possible using the Gram determinant speech presence metric. These can be derived analytically for a Gaussian speech probability distribution or numerically for the Laplacian, gamma or other speech probability models.

Figure 4A:
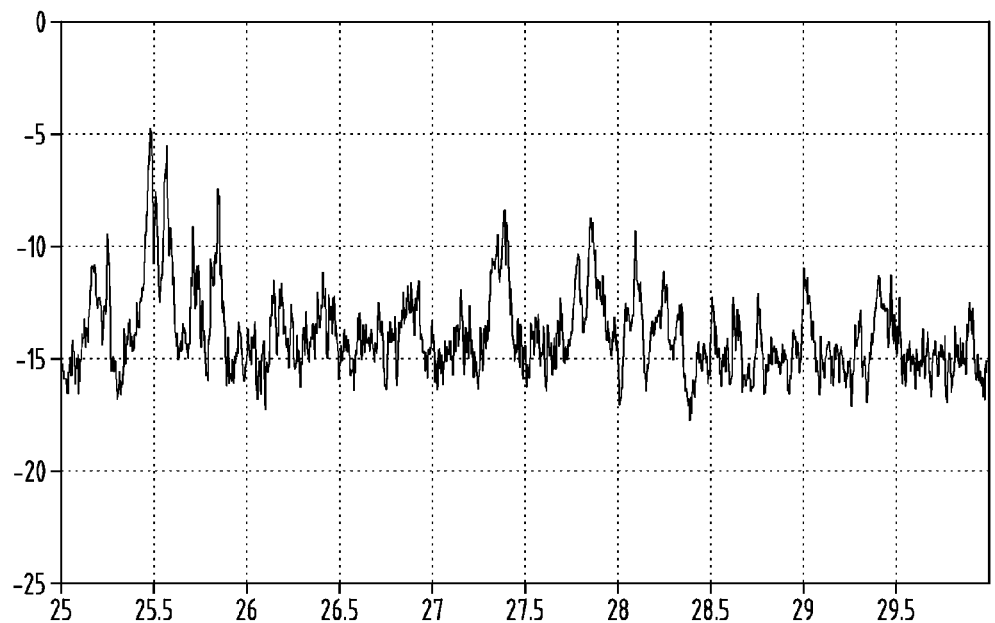
FIG. 4A and FIG. 4B are graphs showing voice plots in a vehicular environment illustrating the detection of speech according to an embodiment of the present invention.
Figure 4B:
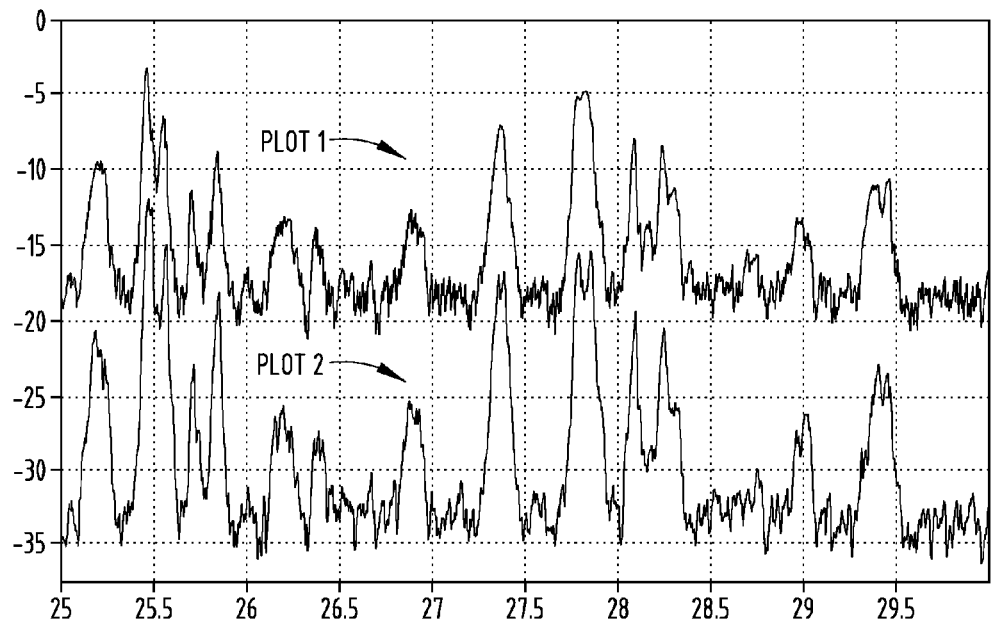

FIG. 4A and FIG. 4B are plotted graphs showing graphical data evidencing voice detection and processing according to various embodiments of the present invention. More specifically, FIG. 4A illustrates a plot showing voice magnitude graphed as amplitude in dB vs. time at 1 kHz. The graph shows a voice sample having typical peaks and valleys at a centerline of approximately −15 dB where the peaks are voice amplitude peaks.

FIG. 4B illustrates a plot showing the voice sample shown in FIG. 4A when the voice is processed according to the steps of the invention as described herein. Plot 1 shows the voice as applied to a Bryson-Schwetz-Turnbull (BST) algorithm that is described in U.S. patent application Ser. No. 13/169,614, entitled Space Time Noise Reduction System For Use in a Vehicle and Method of Forming Same, which is commonly assigned to Gentex Corporation, and is herein incorporated by reference in its entirety. Like the present invention, the BST algorithm uses both amplitude and phase data to detect speech in the presence of noise. However, the BST algorithm uses angular information to weight the signal magnitude.

Alternatively, plot 2 shows an algorithm according to the present invention where a speech metric is calculated through the use of a covariance matrix using non-spatial noise reduction techniques as described herein. Comparing Plot 1 and Plot 2, Plot 2 more clearly identifies peaks in speech with a higher amplitude than those shown by Plot 1. Those skilled in the art will recognize that the plots as shown in both FIGS. 4A and 4B are illustrated so that each is synchronized over the same time period. This helps to better illustrate how the present invention can more effectively identify voice in a noisy automotive environment.

Thus, according to an embodiment of the invention, two or more microphones that are independent of spatial location are used in a vehicular environment, that are insensitive to individual microphone gain. As described by the system and method herein, a method according to an embodiment of the invention uses a covariance matrix, such as a Gram matrix, for noise reduction. Those skilled in the art will recognize that a covariance matrix contains elements which are scalar products of repeated integrals of the impulse response of the system. In system applications, the elements of this matrix can be generated experimentally, whereas in model-reduction applications the elements of this matrix have to be computed from the mathematical model of the original system (e.g. a two or more element microphone array). This allows a voice signal to be more easily recognized and/or identified in the presence of noise as compared to other mathematical techniques.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A non-spatial speech detection system comprising:
a plurality of microphones;
a fixed beamformer for receiving the output of the plurality of microphones;
an adaptive beamformer for receiving the output of the plurality of microphones; and
at least one processor for processing an output from the fixed beamformer and identifying speech from noise using algorithm utilizing a covariance matrix.

2. A non-spatial speech detection system as in claim 1, wherein an output of the adaptive beamformer is provided as feedback for adjusting the weight of at least one frequency band that is an output from the adaptive beamformer.

3. A non-spatial speech detection system as in claim 2, wherein the weight is adjusted using a least mean squares (LMS) algorithm.

4. A non-spatial speech detection system as in claim 1, wherein the plurality of microphones receive speech emanating from a driver or front seat passenger in a vehicle.

5. A non-spatial speech detection system as in claim 1, wherein the plurality of microphones are located in a rear view housing.

6. A non-spatial speech detection system as in claim 5, wherein the rear view housing includes a mirror element.

7. A non-spatial detection system as in claim 1, wherein the covariance matrix is a Gram matrix.

8. A non-spatial speech detection system comprising:
a plurality of microphones; and
at least one processor for processing at least one real audio signal received by the plurality of microphones so that the real audio signal is processed by formatting each frequency band of a plurality of complex frequency bands into a covariance matrix having a plurality of covariance matrix elements and calculating a determinant for each of the covariance matrix elements to provide a speech presence metric to utilize the speech presence metric for identifying speech within the at least one real audio signal, wherein the covariance matrix is generated from an output of a fixed beamformer.

9. A non-spatial speech detection system as in claim 8, wherein the covariance matrix is a Gram matrix.

10. A non-spatial speech detection system as in claim 8, wherein the speech is identified in the presence of noise.

11. A non-spatial speech detection system as in claim 8, wherein the plurality of microphones are located in a vehicle.

12. A non-spatial speech detection system as in claim 8, wherein the at least one real audio signal is speech emanating from the driver or front seat passenger in a vehicle.

13. A non-spatial speech detection system as in claim 8, wherein the plurality of microphones are located in a rear view housing.

14. A non-spatial speech detection system as in claim 13, wherein the rear view housing includes a mirror element.

15. A non-spatial speech detection system comprising:
a plurality of microphones located in a vehicle; and
at least one processor for processing at least one real audio signal received by the plurality of microphones wherein the at least one real audio signal is processed using the steps of;
transforming each frame of the real audio signal into a plurality of complex bands using a fast Fourier transform;
formatting each band of the plurality of complex bands into a covariance matrix having a plurality of matrix elements;
calculating a determinant from the plurality of covariance matrix elements to provide a speech presence metric;
transforming the speech presence metric into a gain function;
calculating a fast average value and slow average value from the gain function; and
utilizing an input signal and the gain function for identifying speech within the at least one real audio signal.

16. A non-spatial speech detection system as in claim 15, wherein the covariance matrix is a Gram matrix.

17. A non-spatial speech detection system as in claim 15, wherein the at least one real audio signal is speech emanating from the driver or front seat passenger in the vehicle.

18. A non-spatial speech detection system as in claim 15, wherein the at least one processor uses no spatial information from the at least one real time audio signal for detecting speech.

19. A non-spatial speech detection system as in claim 15, further comprising at least one beamformer for receiving the at least one rear time audio signal from the plurality of microphones.

20. A non-spatial speech detection as in claim 15, wherein the plurality of microphones are located in a rear view housing.

21. A non-spatial speech detection system as in claim 15, wherein the rear view housing includes a mirror element.

22. A non-spatial detection system as in claim 1, wherein the fixed beamformer corresponds to a guide beam aimed in a fixed direction.

23. A non-spatial detection system as in claim 1, wherein the output from the fixed beamformer is utilized in the covariance matrix to generate a substantially noise free signal for identifying the speech.

\* \* \* \* \*

UNITED STATES PATENT AND TRADEMARK OFFICE
CERTIFICATE OF CORRECTION

PATENT NO.       : 8,935,164 B2
APPLICATION NO.  : 13/462506
DATED            : January 13, 2015
INVENTOR(S)      : Turnbull et al.

It is certified that error appears in the above-identified patent and that said Letters Patent is hereby corrected as shown below:

In the Specification

Col. 1, line 60;
  After "a" ($1^{st}$ occurrence) insert --normalized--.

Col. 3, line 25;
  After "The" delete "new".

Col. 6, line 19;
  "slow_spm=$\alpha_s$slow_spm-(1-$\alpha_s$)fast_spm" should be
  --slow_spm=$\alpha_s$slow_spm+(1-$\alpha_s$)fast_spm--.

Signed and Sealed this
Twenty-third Day of June, 2015

Michelle K. Lee
*Director of the United States Patent and Trademark Office*